(12) United States Patent
Khojastepour et al.

(10) Patent No.: US 10,292,059 B2
(45) Date of Patent: May 14, 2019

(54) MANAGING ANALOG BEAMS IN MMWAVE NETWORKS

(71) Applicant: NEC Laboratories America, Inc., Princeton, NJ (US)

(72) Inventors: Mohammad Khojastepour, Lawrenceville, NJ (US); Narayan Prasad, Williow Grove, PA (US); Sampath Rangarajan, Bridgewater, NJ (US); Yasaman Ghasempour, Houston, TX (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/874,016

(22) Filed: Jan. 18, 2018

(65) Prior Publication Data
US 2018/0213415 A1    Jul. 26, 2018

Related U.S. Application Data
(60) Provisional application No. 62/448,638, filed on Jan. 20, 2017.

(51) Int. Cl.
| | |
|---|---|
| *H04W 24/02* | (2009.01) |
| *H04W 72/04* | (2009.01) |
| *H04W 16/28* | (2009.01) |
| *H04B 7/02* | (2018.01) |

(52) U.S. Cl.
CPC ........... *H04W 24/02* (2013.01); *H04B 7/02* (2013.01); *H04W 16/28* (2013.01); *H04W 72/044* (2013.01)

(58) Field of Classification Search
CPC ... H04W 24/02; H04W 16/28; H04W 72/044; H04B 7/02
See application file for complete search history.

(56) References Cited

U.S. PATENT DOCUMENTS

| | | | |
|---|---|---|---|
| 9,137,698 B2 | 9/2015 | Li et al. | |
| 2013/0286960 A1 | 10/2013 | Li et al. | |
| 2014/0073337 A1 | 3/2014 | Hong et al. | |
| 2017/0303286 A1* | 10/2017 | Sang | H04W 72/085 |
| 2017/0331577 A1* | 11/2017 | Parkvall | H04J 11/0079 |

* cited by examiner

*Primary Examiner* — Marcos L Torres
(74) *Attorney, Agent, or Firm* — Joseph Kolodka

(57) ABSTRACT

A computer-implemented method executed in a wireless communication system for establishing communication links in a millimeter wave network is presented. The method includes determining active communication links between a plurality of transmitters and a plurality of receivers operated by a plurality of users and formulating a quality of service (QoS) proportional fairness (PF) network utility as a constrained submodular set function maximization problem. The method further includes performing an optimization framework by optimizing, based on the active communication links, user association for fixed transmit beam patterns and optimizing, based on the active communication links, the fixed transmit beam patterns and corresponding beam attributes for a fixed set of user associations. The method also includes iteratively performing the optimizing steps in an alternating manner to determine a user from the plurality of users that optimizes the constrained submodular set function maximization problem and assigning the determined user to a cell.

20 Claims, 4 Drawing Sheets

MANAGING ANALOG BEAMS IN MMWAVE NETWORKS

RELATED APPLICATION INFORMATION

This application claims priority to Provisional Application No. 62/448,638, filed on Jan. 20, 2017, incorporated herein by reference in its entirety.

BACKGROUND

Technical Field

The present invention relates to millimeter wave (mmWave) communication technology and, more particularly, to managing analog beams in mmWave networks.

Description of the Related Art

Millimeter-wave communication technology refers to a technology using an electromagnetic wave whose wavelength is one centimeter to one millimeter (corresponding to a frequency range of 30 GHz to 300 GHz) to communicate. Currently, civil millimeter wave communication technology mainly uses a spectrum whose frequency band is about 60 GHz. The biggest advantage of 60 GHz technology is very wide transmission bandwidth and in a vicinity of 60 GHz it can provide up to 5 GHz transmission bandwidth, where an occupied working frequency can be used without authorization. Because the electromagnetic spectrum is a strong absorption peak close to the 60 GHz range, electromagnetic wave propagation decay in this frequency range is very large.

SUMMARY

A computer-implemented method executed in a wireless communication system for establishing communication links in a millimeter wave (mmWave) network is presented. The method includes determining active communication links between a plurality of transmitters and a plurality of receivers operated by a plurality of users and formulating a quality of service (QoS) proportional fairness (PF) network utility as a constrained submodular set function maximization problem. The method further includes performing an optimization framework by optimizing, based on the active communication links, user association for fixed transmit beam patterns and optimizing, based on the active communication links, the fixed transmit beam patterns and corresponding beam attributes for a fixed set of user associations. The method also includes iteratively performing the optimizing steps in an alternating manner to determine a user from the plurality of users that optimizes the constrained submodular set function maximization problem and assigning the determined user to a cell.

A system for establishing communication links in a millimeter wave (mmWave) network is presented. The system includes a memory and a processor in communication with the memory, wherein the processor is configured to determine active communication links between a plurality of transmitters and a plurality of receivers operated by a plurality of users, formulate a quality of service (QoS) proportional fairness (PF) network utility as a constrained submodular set function maximization problem, perform an optimization framework by: optimizing, based on the active communication links, user association for fixed transmit beam patterns and optimizing, based on the active communication links, the fixed transmit beam patterns and corresponding beam attributes for a fixed set of user associations, iteratively perform the optimizing steps in an alternating manner to determine a user from the plurality of users that optimizes the constrained submodular set function maximization problem, and assign the determined user to a cell.

A non-transitory computer-readable storage medium comprising a computer-readable program for establishing communication links in a millimeter wave (mmWave) network, wherein the computer-readable program when executed on a computer causes the computer to perform the steps of determining active communication links between a plurality of transmitters and a plurality of receivers operated by a plurality of users and formulating a quality of service (QoS) proportional fairness (PF) network utility as a constrained submodular set function maximization problem. The non-transitory computer-readable storage medium further performs the steps of performing an optimization framework by optimizing, based on the active communication links, user association for fixed transmit beam patterns and by optimizing, based on the active communication links, the fixed transmit beam patterns and corresponding beam attributes for a fixed set of user associations. The non-transitory computer-readable storage medium further performs the steps of iteratively performing the optimizing steps in an alternating manner to determine a user from the plurality of users that optimizes the constrained submodular set function maximization problem and assigning the determined user to a cell.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In the exemplary embodiments of the present invention, managing analog beams in millimeter wave (mmWave) networks is presented. In the exemplary embodiments, the user association problem to optimize the generalized quality of service (QoS) proportional fairness (PF) utility can be formulated as a submodular set function maximization problem. This result opens up a variety of distributed and centralized algorithms which can be employed to determine an approximately optimal user association. A simple distributed algorithm can thus be employed to optimize the analog beam parameters. The method, while being fully compatible with the signaling standardized by the 3$^{rd}$ generation partnership project (3GPP) for backhaul communication, provably converges to a social equilibrium even in the presence of backhaul erasures.

In the exemplary embodiments of the present invention, the generalized Quality-of-Service (QoS) Proportional Fairness (PF) network utility can be adopted to balance efficiency with fairness, and is particularly relevant for coverage constrained mmWave systems, since QoS constraints demand provisioning a minimum rate for each user. Since the user association problem under this QoS-PF utility can be formulated as a constrained submodular set function maximization problem, it can be optimally solved (up to an additive constant) using distributed algorithms. The simple distributed algorithm can optimize the choice of beams and their attributes, and converges to a social equilibrium even in the presence a non-ideal communication channel between cells.

In the exemplary embodiments of the present invention, a method used in wireless communication systems in order to perform inter-cell scheduling including an iterative procedure between two alternative steps is presented. In the first step, user association is optimized for a fixed transmit beam pattern and in a second step the transmit beam patterns and its attributes are optimized for a fixed set of user associations. The beam attributes include the duty cycles and power allocations.

Figure 1:
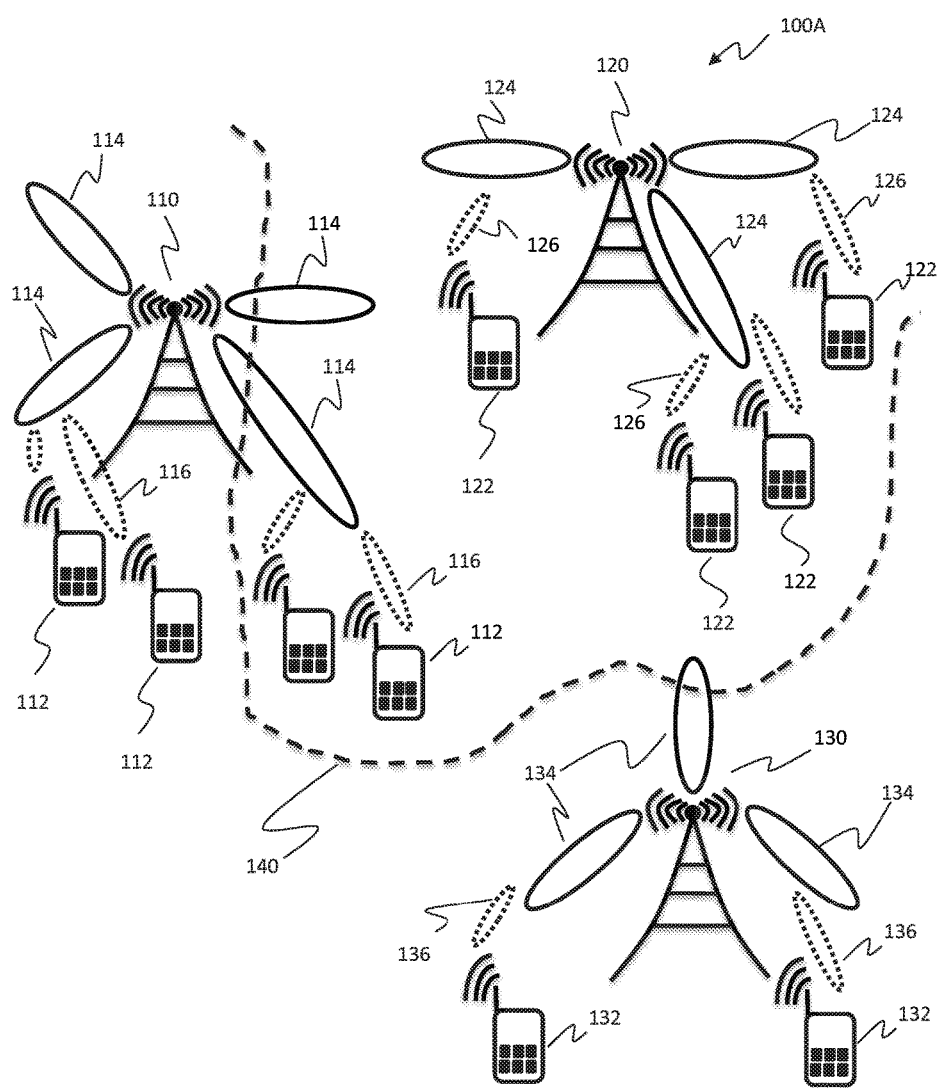
FIG. 1 is a block/flow diagram illustrating a first configuration of a millimeter wave network, in accordance with embodiments of the present invention.

FIG. 1 is a block/flow diagram illustrating a first configuration 100A of a millimeter wave network, in accordance with embodiments of the present invention.

A plurality of first users 112 are located within a mmWave network or propagation environment. Transmit and receive beams 114, 116 are transmitted between the plurality of users 112 and transmission point (TP) 110.

A plurality of second users 122 are located within a mmWave network or propagation environment. Transmit and receive beams 124, 126 are transmitted between the plurality of users 122 and transmission point (TP) 120.

A plurality of third users 132 are located within a mmWave network or propagation environment. Transmit and receive beams 134, 136 are transmitted between the plurality of users 132 and transmission point (TP) 130.

The first configuration 100A depicts user association 140 and transmit and receive analog beamforming with the capacity of the beams being proportional to their power levels or duty cycles.

Figure 2:
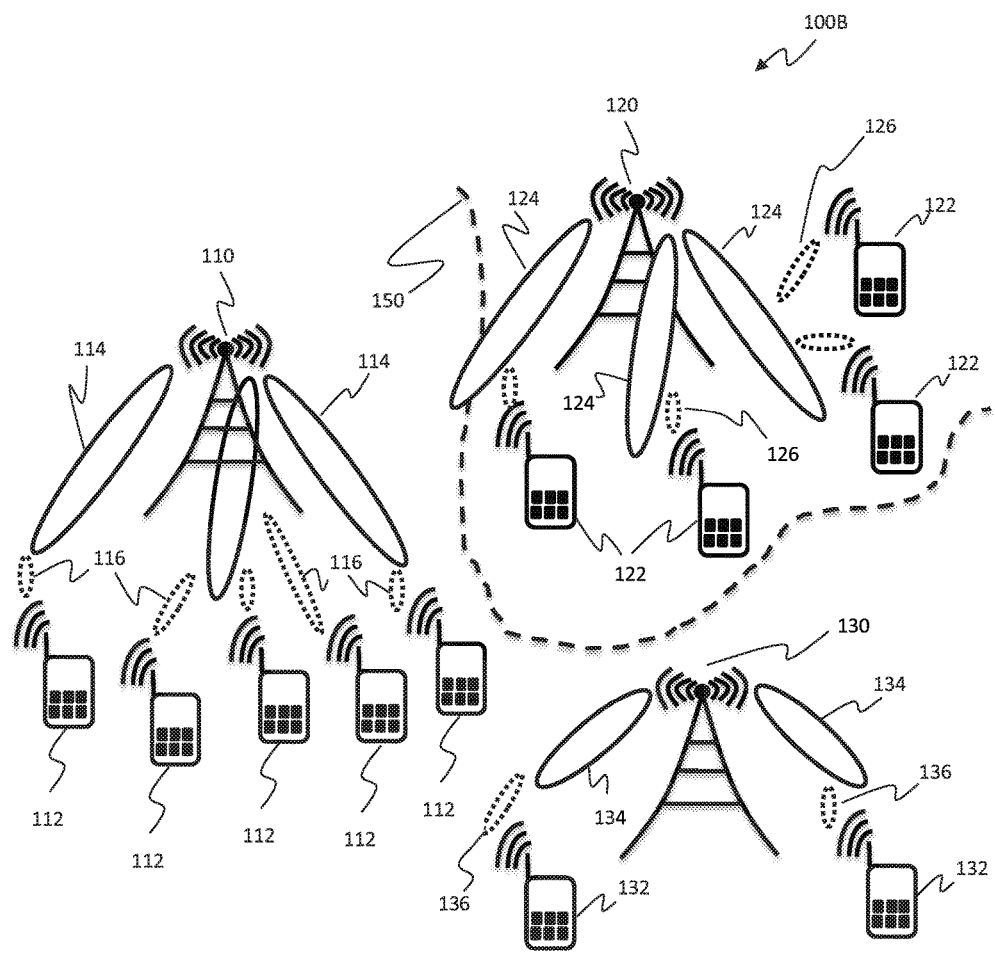
FIG. 2 is a block/flow diagram illustrating a second configuration of a millimeter wave network, in accordance with embodiments of the present invention.

FIG. 2 is a block/flow diagram illustrating a second configuration 100B of a millimeter wave network, in accordance with embodiments of the present invention.

A plurality of first users 112 are located within a mmWave network or propagation environment. Transmit and receive beams 114, 116 are transmitted between the plurality of users 112 and transmission point (TP) 110.

A plurality of second users 122 are located within a mmWave network or propagation environment. Transmit and receive beams 124, 126 are transmitted between the plurality of users 122 and transmission point (TP) 120.

A plurality of third users 132 are located within a mmWave network or propagation environment. Transmit and receive beams 134, 136 are transmitted between the plurality of users 132 and transmission point (TP) 130.

The second configuration 100B depicts user association 150 and transmit and receive analog beamforming with the capacity of the beams being proportional to their power levels or duty cycles. The second configuration 100B is better optimized than the first configuration 100A of FIG. 1. This will be more evident in view of the problem formulation described below.

Regarding the problem formulation, let U denote a set of users with cardinality |U|=K. Each user has multiple receive antennas, one receive radiofrequency (RF) chain and can select any vector from a finite codebook for analog receive beamforming. Let M denote a set of transmission points (TPs), where each TP has $N_{TX}$ & $S_{TX}$ transmit antennas and RF chains, respectively. Further, let B denote a codebook of transmit analog beams.

For each TP m∈M, let $\Gamma_{m,b}$∈S denote the duty cycle of the b$^{th}$ beam for TP m, where S denotes a pre-defined finite set of such duty cycles. In particular, each $\Gamma_{m,b}$ lies in the unit interval [0,1] and denotes a fraction of a frame duration for which the b$^{th}$ beam is activated in the m$^{th}$ TP. Thus, $\Gamma_{m,b}$=0 implies that the b$^{th}$ beam is not activated at all by the m$^{th}$ TP, whereas $\Gamma_{m,b}$=1 implies that the b$^{th}$ beam is activated for the entire frame duration by the m$^{th}$ TP. Note that precise positions (or subframes) in a frame where a beam is activated by a TP are not optimized, since doing so without the knowledge of instantaneous fading seen on that subframe is not useful.

$\Gamma=[\Gamma_{m,b}]_{m\in M, b\in B}$ denotes the collection of all chosen duty cycles, whereas $\Gamma_{(m)}=[\delta_{m,b}]_{b\in B}$ denotes those pertaining to TP m for each m∈M. Then, let $P_m$ denote a power-level at which a signal is transmitted along any beam used by the m$^{th}$ TP and let P denote a finite set of all possible power levels. Finally, let $P=[P_m]_{m\in M}$ be a vector of chosen power levels.

Let $R_{u,m,b}(\Gamma,P)$ denote an estimated achievable peak rate for the u$^{th}$ user when it is served by the m$^{th}$ TP using the b$^{th}$ beam, given all the chosen duty cycles in $\Gamma$ and power levels in P. Any suitable peak rate estimation rule is permitted which uses: (i) estimates of slow fading parameters (e.g., path loss, shadowing and spatial correlations) seen by user u on the frame of interest but not the instantaneous fast-fading ones and (ii) the best analog receive beamforming vector at user u among those in the given finite receive beamforming codebook.

The problem of interest in (1) can now be posed as follows.

$$\max_{\Gamma_{m,b}\in S, P_m\in P, \gamma_{u,m,b}\in[0,1]\forall u\in U, b\in B, m\in M} \left\{\sum_{u\in U} w_u \log\left(\sum_{m\in M}\sum_{b\in B} R_{u,m,b}(\Gamma,P)\gamma_{u,m,b}\right)\right\} \quad (1)$$

$$\text{s.t. } \sum_{b\in B}\Gamma_{m,b}\leq S_{TX} \text{ \& } \sum_{u\in U}\gamma_{u,m,b}\leq 1, \forall b\in B, m\in M; \sum_{b\in B} 1\{\Gamma_{m,b}>0\}\leq L \text{ \& } f_m(\Gamma_{(m)},P_m)\leq 1, \forall m\in M;$$

$$\sum_{m\in M}\sum_{b\in B}\gamma_{u,m,b}R_{u,m,b}(\Gamma,P)\geq R_u^{\min}, \sum_{m\in M}\sum_{b\in B} 1\{\gamma_{u,m,b}>0\}=1, \forall u\in U;$$

In (1), 1{.} denotes an indicator function which is one if the input argument is true and is zero otherwise. Noting that the objective in (1) is the generalized PF utility in which $w_u > 0$ is a weight assigned to the $u^{th}$ user, constraints imposed are as follows:

The first set of constraints enforce that a sum of non-negative fractions $\{\gamma_{u,m,b}\}$ for each TP and beam combination, which are normalized by the duty cycle chosen for that combination and henceforth are referred to as allocation fractions, over all the users should not exceed unity. Further, a sum of duty cycles across all activated beams in any TP m should not exceed a number of transmit RF chains $S_{TX}$.

The total number of activated beams at any TP should not exceed L. Note that $S_{TX} \leq L \leq N_{TX}$. Choosing a larger value of L can improve performance but at the cost of an increased channel state information (CSI) acquisition overhead.

The chosen set of duty cycles and the power level at any TP m must be compatible, i.e., must satisfy $f_m(\Gamma_{(m)}, P_m) \leq 1$. For instance, the function $f_m(.)$ can check a sum power budget at TP m.

Considering each user, minimum rate constraints can also be imposed. By incorporating such minimum rate constraints, the most general PF utility that allows for different user priorities and Quality-of-Service (QoS) has been addressed.

Another constraint imposed is that each user is allowed to be served by any one TP using any one beam. This constraint is meaningful for coarse time scale optimization in mmWave systems since each user receives the bulk of its data along one beam, which is typically line-of-sight (LoS). Note however that the beamforming vectors used by a TP in the fine time-scale (subframe granularity) to serve its associated users can be constructed based on the knowledge of instantaneous fading and can be any vectors in the span of its chosen beam group.

An alternating optimization framework is adopted to optimize (1). In particular, the user association and beam parameters (duty cycles and power levels) are optimized in an alternating manner. In each case, novel algorithms with certain optimality guarantees are provided.

The user association and allocation fractions are jointly optimized for any given set of duty cycles and power levels $(\hat{\Gamma}, \hat{P})$. The problem of interest can be written as in (2), where $x_{u,m,b}$ denotes an indicator variable that is one if user u can be served using beam b and TP m and zero otherwise. Notice that upon fixing any choice of $\{x_{u,m,b}\}$ the optimization of allocation fractions in (2) decouples into $|M||B|$ optimization problems, one for each beam, TP combination.

$$\max_{x_{u,m,b} \in \{0,1\}, \gamma_{u,m,b} \in [0,1] \forall u \in U, b \in B, m \in M} \left\{ \sum_{u \in U} w_u \log\left( \sum_{m \in M} \sum_{b \in B} R_{u,m,b}(\hat{\Gamma}, \hat{P}) \gamma_{u,m,b} x_{u,m,b} \right) \right\} \quad (2)$$

$$\text{s.t.} \sum_{u \in U} \gamma_{u,m,b} x_{u,m,b} \leq 1, \forall b \in B, m \in M; \sum_{m \in M} \sum_{b \in B} \gamma_{u,m,b} x_{u,m,b} R_{u,m,b}(\hat{\Gamma}, \hat{P}) \geq R_u^{min}, \forall u \in U;$$

$$\sum_{m \in M} \sum_{b \in B} x_{u,m,b} = 1, \forall u \in U.$$

A ground set $\underline{\Omega} = \{(u,m,b), u \in U, b \in B, m \in M\}$ is defined where (u,m,b) conveys the association of user u with TP m and beam b (e.g., is equivalent to setting $x_{u,m,b}=1$). Without loss of generality, it is assumed that only a tuple (u,m,b) for any $u \in U$ & $b \in B, m \in M$ for which $R_{u,m,b}(\hat{\Gamma}, \hat{P}) \geq R_u^{min}$ is included in $\underline{\Omega}$. This is because any tuple not satisfying this assumption will never be selected as its minimum rate cannot be met even when the assigned TP along the chosen beam fully allocates its resource to that user.

Let $\underline{\Omega}^{(m',b')} = \{(u,m,b) \in \underline{\Omega} : b=b', m=m'\}$ denote all possible associations of users to the TP and beam combination m',b', where $b' \in B$ & $m' \in M$, and let $\underline{\Omega}_{(u')} = \{(u,m,b) \in \underline{\Omega} : u=u'\}$ denote all possible associations of a user $u' \in U$.

A family of sets $\underline{J}$ is defined as the one which includes each subset of $\underline{\Omega}$ such that the tuples in that subset have mutually distinct users and the minimum rates of those users are feasible. Notice that any $\underline{G} \in \underline{J}$ specifies a particular choice of $\{x_{u,m,b}\}$ for (2) satisfying $\Sigma_{m \in M} \Sigma_{b \in B} x_{u,m,b} \leq 1$, $\forall u \in U$ and if $\underline{G}$ is maximal (i.e., $|\underline{G}|=K$) then a valid user association satisfying $\Sigma_{m \in M} \Sigma_{b \in B} x_{u,m,b}=1$, $\forall u \in U$ is obtained.

Further, $\underline{J}$ is a downward closed family, e.g., if $\underline{G} \in \underline{J}$ then each subset of $\underline{G}$ is also a member of $\underline{J}$. Next, a real-valued set function is defined on $\underline{J}$, $f_2 : \underline{J} \to \mathbb{R}$ such that it is normalized $f(\phi)=0$, where $\phi$ is the empty set, and for any non-empty set $\underline{G} \in \underline{J}$, the relationship is given as:

$$f(\underline{G}) = \sum_{m \in M} \sum_{b \in B} f_{m,b}(\underline{G} \cap \underline{\Omega}^{(m,b)}). \quad (3)$$

Each $f_{m,b} : \underline{J}^{(m,b)} \to \mathbb{R}$ in (3) is a normalized set function that is defined on the family $\underline{J}^{(m,b)}$ including each member of $\underline{J}$ that is contained in $\underline{\Omega}^{(m,b)}$, as follows. For any set $\underline{A} \in \underline{J}^{(m,b)}$, $f_{m,b}(\underline{A})$ is defined to be an optimal objective value obtained by optimizing allocation fractions of all users with $x_{u,m,b}=1$ for a combination m,b under consideration. The optimization of the allocation fractions for any (m,b) and the associated users is detailed in Proposition 2 (described below) along with a simple necessary and sufficient condition to determine feasibility of the minimum rates for the given choice of association. With these definitions in hand, the problem in (2) can be re-formulated as the following constrained set function maximization problem.

$$\max_{\underline{G} \in \underline{J} : |\underline{G}|=K} \{f(\underline{G})\} \quad (4)$$

The first main result that characterizes $f(.)$ is given as follows.

The set function $f(.)$ is a normalized submodular set function.

The set function $f(.)$ in (3) defined on the family $\underline{J}$ is normalized by construction. Then, to establish submodularity of $f(.)$ on the family $\underline{J}$, it suffices to show that each $f_{m,b}(.)$ is submodular on the family $\underline{J}^{(m,b)}$. Without loss of generality, any TP m with beam b is considered and shows that:

$$f_{m,b}(\underline{E} \cup (u_1,m,b)) - f_{m,b}(\underline{E}) \geq f_{m,b}(\underline{F} \cup (u_1,m,b)) - f_{m,b}(\underline{F}), \quad (5)$$

for all $\underline{E} \subseteq \underline{F} \in \underline{J}^{(m,b)} : |\underline{F}|=|\underline{E}|+1$
and any $(u_1,m,b) \in \underline{\Omega} \setminus \underline{F} : \underline{F} \cup (u_1,m,b) \in \underline{J}^{(m,b)}$.

Toward this end, $\underline{F} = \underline{E} \cup (u_2,m,b)$ is expanded where $(u_2,m,b) \in \underline{J}^{(m,b)}$ is obtained with $u_2 \neq u_1$. Then, $f_{m,b}(\underline{F} \cup (u_1,m,b))$ is evaluated as described in Proposition 2, provided below, (using unit budget) and in the obtained optimal allocation fractions let the share of resource (allocation fraction) assigned to user $u_1$ in tuple $(u_1,m,b)$ be $\delta_1$. Similarly, let the share of resource assigned to user $u_2$ in tuple $(u_2,m,b)$ be $\delta_2$.

Then define $\hat{\zeta} = 1 - \delta_1 - \delta_2$.

Thus:

$$f_{m,b}(\underline{F} \cup (u_1,m,b)) = \hat{O}(\hat{\zeta}) + w_{u_1} \log(R_{u_1,m,b}(\hat{\Gamma},\hat{P})\delta_1) + w_{u_2} \log(R_{u_2,m,b}(\hat{\Gamma},\hat{P})\delta_2), \quad (6)$$

where $\hat{O}(\hat{\zeta})$ is the objective value evaluated for the tuples in $\underline{E}$ under the budget $\hat{\zeta}$, using Proposition 2. Further, it can be readily verified that $$f_{m,b}(\underline{F}) \geq \hat{O}(\hat{\zeta}+\delta_1) + w_{u_2} \log(R_{u_2,m,b}(\hat{\Gamma},\hat{P})\delta_2),$$

$$f_{m,b}(\underline{E}) = \hat{O}(\hat{\zeta}+\delta_1+\delta_2)$$

$$f_{m,b}(\underline{E} \cup (u_1,m,b)) \geq \hat{O}(\hat{\zeta}+\delta_2) + w_{u_1} \log(R_{u_1,m,b}(\hat{\Gamma},\hat{P})\delta_1). \quad (7)$$

Using (6) and (7) in (5), it is now seen that a sufficient condition for (5) to hold is for (13) to be true. The latter is assured by Proposition 2 which yields the desired result. Equation (4) is a constrained submodular set function maximization problem which can be approximately maximized by leveraging existing distributed or centralized algorithms, which can guarantee optimality up to an additive constant.

$$\max_{\psi \in \Psi} \left\{ \sum_{m \in M} \max_{\{\gamma_{u,m,b}\}_{u \in U_m, b \in B} \in F_m(\psi)} \left\{ \sum_{u \in U_m} w_u \log\left(\sum_{b \in B} R_{u,m,b}(\psi)\gamma_{u,m,b}\right) \right\} \right\} \quad (8)$$

Moreover, it is assumed that a user association, $\{x_{u,m,b} = \hat{x}_{u,m,b}\}$ has been provided. Thus, the set of duty cycles and power levels are optimized based on the given association. In particular, for each TP $m \in M$, $U_m$ is determined to be the set of users associated with TP m under the given association, e.g., $U_m = \{u \in U : \max_{b \in B}\{\hat{x}_{u,m,b}\} = 1\}$. Then, for each TP, the beam parameters as well as the intra-TP user association are optimized, e.g., each user in $U_m$ is permitted to be served by TP m using any one beam in B. Otherwise the method will be restricted to using only the beams that have at least one associated user as per the given association and no beam alteration at any TP would be possible.

Next, a state of any TP $m \in M$ is defined by its choice of duty cycles and power levels as $\psi_m = (\Gamma_{(m)}, P_m)$. The set of all feasible states that any TP can be is finite and is denoted by $\Psi$. By a feasible state for any TP m, it is meant the state that satisfies the constraints imposed on the sum of the chosen duty cycles and number of activated beams, as well as the compatibility between the chosen duty cycles and power level. Notice that $\Psi \subseteq (\otimes_{b \in B} S) \otimes P$.

The system state is defined as the collection of states of all TPs, as $\psi = \{\psi_m\}_{m \in M}$.

Finally, the set of all system states is denoted by $\Psi = \otimes_{m \in M} \Psi$. Notice that $\Psi$ is also finite with cardinality at most $|S|^{|M||B|}|P|^{|M|}$.

$R_{u,m,b}(\Gamma,P)$ is then written as $R_{u,m,b}(\psi)$, $\forall b \in B$, $u \in U_m$ and a region of all feasible allocation fractions at any TP $m \in M$ is defined as:

$$F_m(\psi) = \left\{ \gamma_{u,m,b} \in [0,1] \forall u \in U_m, b \in B : \right.$$

$$\sum_{u \in U_m} \gamma_{u,m,b} \leq 1, \forall b \in B;$$

$$\sum_{b \in B} \gamma_{u,m,b} R_{u,m,b}(\psi) \geq R_u^{min}, \forall u \in U_m;$$

$$\left. \sum_{b \in B} 1\{\gamma_{u,m,b} > 0\} \leq 1, \forall u \in U_m \right\}.$$

The problem of interest in (8) can now be formulated. Note that for any (tentative) choice of system state $\psi$, an inner maximization problem at each TP m in (8) is just the intra-TP user association and allocation fraction optimization problem, which can be expressed as a constrained submodular maximization problem. The natural greedy algorithm is adopted to sub-optimally solve this problem and let $h_m(\psi)$ denote the value obtained by TP m. Each TP can adopt any centralized algorithm to solve its sub-problem and $h_m(\psi) = -\infty$ is set whenever the minimum rates of all users in $U_m$ cannot be met using the chosen method. Let $h(\psi)$ denote the objective value in (8) obtained as $h(\psi) = \sum_{m \in m} h_m(\psi)$.

Next, for each TP $m \in M$, given its current state $\psi_m \in \Psi$, the set of actions is defined as $\Theta(\psi_m, m)$. Here, $\Theta(\psi_m, m) \subset \Psi$ and denotes the set of other states TP m can transition to from its current one. Limiting the size of $\Theta(\psi_m, m)$ reduces the complexity but at the cost of performance guarantee. To quantify the impact of any action $\vartheta \in \Theta(\psi_{m1}, m1)$ by TP m1 on itself as well as any other TP in M, $g(\vartheta, m1, m2, \psi)$ denotes the change in utility over users associated to TP m2 when TP m1 changes its state to $\vartheta$ and all other TPs retain their respective current states. Notice that each TP m2 can compute:

$$g(\vartheta, m1, m2, \psi) = h_{m2}(\psi') - h_{m2}(\psi), \quad (9)$$

where $\psi'$ includes the changed state of TP m1, $\vartheta$, while $\psi$ includes the original state of TP m1. Thus, the impact (or change in system utility) of TP m1 taking action $\vartheta$ can be quantified as $\sum_{m2 \in M} g(\vartheta, m1, m2, \psi)$.

With these definitions in hand, the first algorithm (or algorithm 1) is presented. The time axis is divided into intervals of identical size, referred to as update intervals. In each interval, each TP m1 requests the impact of each of its allowed actions on the utility contribution of all other TPs. In one scenario, the backhaul connection between TP m1 and TP $m2 \in M : m2 \neq m1$ is vulnerable to errors or jitters. Each backhaul channel is modeled as an erasure channel, where the erasures are independent across update intervals and backhaul channels. Accordingly, it is assumed that the impact of all of its actions can be obtained by TP m1 with probability $q(\psi_{m1}, m1) \triangleq \Pi_{m2 \in M : m2 \neq m1} q(\psi_{m1}, m1, m2)$ where this probability is strictly positive and is allowed to depend on the TP and its state. Then, if no erasures occur, TP m1 determines its best action with respect to improvement in system utility (assuming all other TPs retain their respective states). Further, if the best such improvement is greater than a specified threshold $\epsilon$, the corresponding action is accepted with a probability $p_{m1}$. The process continues until no TP can determine a state (in the absence of erasures) that can offer an improvement greater than $\epsilon$. Notice that the sequence of system states seen across update intervals need not be monotonic (with respect to the system utility). This is because the algorithm is distributed and multiple TPs can update their states in an interval. Despite this, convergence to a social equilibrium can be guaranteed.

Distributed Beam Group Management
Initialize with a user association, a feasible system state $\psi \in \Psi$, probabilities $\{p_m\}_{m \in M}$ and a threshold $\epsilon \geq 0$.
Repeat
At each TP $m1 \in M$:
For each TP $m2 \neq m1$ do
Request and obtain $\hat{g}(\vartheta, m1, m2, \psi)$ for each action $\vartheta \in \Theta(\psi_{m1}, m1)$
End For
If no erasure in feedback from any TP
Compute $$\Delta(\vartheta, m1) = g(\vartheta, m1, m1, \psi) + \sum_{m2 \neq m1} g(\vartheta, m1, m2, \psi), \quad (10)$$

$$\forall \vartheta \in \Theta(\psi_{m1}, m1)$$

Determine $$\hat{\vartheta}_{m1} = \mathrm{argmax}_{\vartheta \in \Theta(\psi_{m1}, m1)} \{\Delta(\vartheta, m1)\}$$

Else
Set $\hat{\vartheta}_{m1} = \psi_{m1}$ and $\Delta(\hat{\vartheta}_{m1}, m1) = 0$.
End If
Set decision to update to be false
If $\Delta(\hat{\vartheta}_{m1}, m1) > \epsilon$ then
Flip decision to update to true with probability $p_{m1}$
EndIf
For each received request from any TP $m2 \neq m1$ for its action $\vartheta'$,
compute $g(\vartheta', m2, m1, \psi)$ and report to TP $m2$.
If decision to update is true then
Update $\psi_{m1}$ to $\hat{\vartheta}_{m1}$ and convey updated state to all other TPs.
End If
Collect all updated states from all other TPs.
Until Termination conditions are satisfied.

Then define an absorbing state (or social equilibrium) as one in which no single TP can improve the system utility more than $\epsilon$ by changing its state to any one in the allowed set of actions. In particular, $\psi \in \Psi$ is deemed an absorbing state if for any other state $\psi' \in \Psi$ such that $\psi'$ differs from $\psi$ only in the state of any one TP $m$ and that differing state satisfies $\psi'_m \in \Theta(\psi_m, m)$, then $h(\psi) \geq h(\psi') - \epsilon$.

Thus, in a first proposition, algorithm 1 provably converges to an absorbing system state.

This is shown by proving that an optimal system state (which yields the globally optimal system utility in (8) for the given association among all feasible states) exists and is also an absorbing state. Thus, the set of absorbing states is finite and non-empty. Further, given any non-absorbing system state it can be verified that a finite sequence of system states can be constructed that begins at the given state and ends at an absorbing one, such that each transition from any state to the next one in that sequence involves an update by exactly one TP and yields a gain (in the system utility) better than $\epsilon$. Moreover, given any two system states $\psi, \psi'$ it can be deduced that a transition from $\psi$ to $\psi'$ is only possible if for each TP $m$ either $\psi'_m = \psi_m$ or $\psi'_m \in \Theta(\psi_m, m)$. For each such possible transition, it can be explicitly determined the transition probability $p(\psi \to \psi')$ as in (11).

$$\left( \prod_{\substack{m \in M \\ \psi_m \neq \psi'_m}} q(\psi_m, m) 1\{\psi'_m = \hat{\vartheta}_m \,\&\, \Delta(\hat{\vartheta}_m, m) > \epsilon\} p_m \right) \quad (11)$$

$$\left( \prod_{\substack{m \in M \\ \psi_m \neq \psi'_m}} (1\{\Delta(\hat{\vartheta}_m, m) \leq \epsilon\} + 1\{\Delta(\hat{\vartheta}_m, m) > \epsilon\}(1 - q(\psi_m, m) + q(\psi_m, m)(1 - p_m))) \right)$$

This transition probability depends only on the system states $\psi, \psi'$. Consequently, the sequence of system states seen across the update intervals forms an absorbing, time homogeneous Markov Chain. Hence, convergence to an absorbing state is guaranteed.

Note that if for any TP $m1 \in M$, the probabilities $q(\psi_{m1}, m1) \forall \psi_{m1} \in \Psi$ all lie in the open interval $(0,1)$, then algorithm 1 will almost surely converge to an absorbing state even without any randomized rule (i.e., with $p_{m1}=1$) at TP $m1$. In other words, since the backhaul injects randomization, algorithm 1 will almost surely converge even if TP $m1$ always (deterministically) chooses its best action whenever it can determine that action's gain to be greater than $\epsilon$.

Regarding the second proposition:
Consider any budget $\zeta > 0$, any set of users $U'$ along with their minimum rates $\{R_u^{min}\}_{u \in U'}$ and peak rates $\{R_u\}_{u \in U'}$ such that $$\Sigma_{u \in U'} \frac{R_u^{min}}{R_u} \leq \zeta.$$

Let $\hat{O}(\zeta)$ denote an optimal objective value of the following optimization problem.

$$\max_{\gamma_u \in [0,1] \forall u \in U'} \left\{ \sum_{u \in U'} w_u \log(R_u \gamma_u) \right\} \quad (12)$$

$$\text{s.t.} \sum_{u \in U'} \gamma_u \leq \zeta; \gamma_u R_u \geq R_u^{min}, \forall u \in U';$$

Then, for any non-negative scalars $\delta, \tilde{\delta}$:

$$\hat{O}(\zeta) - \hat{O}(\zeta+\delta) \leq \hat{O}(\zeta+\tilde{\delta}) - \hat{O}(\zeta+\delta+\tilde{\delta}). \quad (13)$$

It is assumed, without loss of generality, that the user set $U'$ can be parsed as $U' = U_1 \cup U_2$ where $U_1 = \{1, \ldots, k\}$, such that $R_u^{min} > 0, \forall u \in U_1$ and $R_u^{min} = 0, \forall u \in U_2$.
Further, suppose that $w_1 a_1 < w_2 a_2 < \ldots < w_k a_k$, where $$a_u = \frac{R_u}{R_u^{min}}, u \in U_1.$$

Note that for any given set of weights and minimum rates the scalars $\{w_k a_k\}$ will be distinct whenever the slow fading coefficients (on which the peak rates depend) are drawn from a continuous distribution.

Then, since (12) is a convex optimization problem which is feasible for the given budget, the necessary and sufficient Karush-Kuhn-Tucker (K.K.T.) conditions can be employed to deduce the following:

Let $$\tilde{\zeta} = \zeta - \Sigma_{u \in U_1} \frac{R_u^{min}}{R_u}$$

denote the slack budget, e.g., the budget left after meeting the minimum rate requirements.

For any given slack budget $\tilde{\zeta}$, a partition of $U_1$ as $U_1 = \{1, \ldots, m-1\} \cup \tilde{U}_1(\tilde{\zeta})$ is obtained, where $\tilde{U}_1(\tilde{\zeta}) = \{m, \ldots, k\}$ depends on $\tilde{\zeta}$, such that users 1 to m−1 will be assigned exactly their minimum rates. Further, the assigned allocation fractions must satisfy $$\gamma_u = \frac{w_u}{\lambda}, \forall u \in U_2,$$

where $\lambda > 0$ is the Lagrangian variable, and all users in $\tilde{U}_1(\tilde{\zeta})$ are allocated resources in excess of their minimum rate requirements as $$\tilde{\gamma}_u = \frac{w_u}{\lambda} - \frac{1}{a_u}, u \in \tilde{U}_1(\tilde{\zeta}).$$

Next, since the available slack budget C must be fully used, $$\lambda = \frac{\Sigma_{u \in U_2} w_u + \Sigma_{\tilde{U}_1(\tilde{\zeta})} w_u}{\tilde{\zeta} + \Sigma_{u \in \tilde{U}_1(\tilde{\zeta})} 1/a_U}$$

is obtained.

Consider the partition of $\mathbb{R}_+$ as in (14).

$$\left[0, \frac{\sum_{u \in U_2} w_u}{w_k a_k}\right] \cup \left\{\bigcup_{t=k}^{2}\left[\frac{\sum_{u \in U_2} w_u + \sum_{j=t}^{k} w_j}{w_t a_t} - \sum_{j=t}^{k} 1/a_j, \frac{\sum_{u \in U_2} w_u + \sum_{j=t}^{k} w_j}{w_{t-1} a_{t-1}} - \sum_{j=t}^{k} 1/a_j\right)\right\} \cup \left[\frac{\sum_{u \in U_2} w_u + \sum_{j=1}^{k} w_j}{w_1 a_1} - \sum_{j=1}^{k} 1/a_j, \infty\right). \quad (14)$$

Depending on the interval in which the slack budget lies in the above partition, the optimal objective value can be acquired.

In particular, let $a_0 = w_0 = 0 \& a_{k+1} = w_{k+1} = \infty$ and suppose that $$\tilde{\zeta} \in \left[\frac{\Sigma_{u \in U_2} w_u + \sum_{j=t}^{k} w_j}{w_t a_t} - \sum_{j=t}^{k} 1/a_j, \frac{\Sigma_{u \in U_2} w_u + \sum_{j=t}^{k} w_j}{w_{t-1} a_{t-1}} - \sum_{j=t}^{k} 1/a_j\right)$$

for some $t = 1, \ldots, k+1$. Then, $\tilde{U}_1(\tilde{\zeta}) = \{t, \ldots, k\}$ and $$\hat{O}(\tilde{\zeta}) = \sum_{u \in U_1 \setminus \tilde{U}_1(\tilde{\zeta})} w_u \log(R_u^{min}) + \sum_{u \in U_2 \cup \tilde{U}_1(\tilde{\zeta})} w_u \log(w_u R_u) + \quad (15)$$

$$\sum_{u \in U_2 \cup \tilde{U}_1(\tilde{\zeta})} w_u \log\left(\frac{\tilde{\zeta} + \sum_{u \in \tilde{U}_1(\tilde{\zeta})} 1/a_u}{\sum_{u \in U_2} w_u + \sum_{u \in \tilde{U}_1(\tilde{\zeta})} w_u}\right).$$

It can now be verified that whenever the slack budget lies in the open interval $$\tilde{\zeta} \in \left(\frac{\Sigma_{u \in U_2} w_u + \sum_{j=t}^{k} w_j}{w_t a_t} - \sum_{j=t}^{k} 1/a_j, \frac{\Sigma_{u \in U_2} w_u + \sum_{j=t}^{k} w_j}{w_{t-1} a_{t-1}} - \sum_{j=t}^{k} 1/a_j\right)$$

for some $t = 1, \ldots, k+1$, the derivative of $\hat{O}(\tilde{\zeta})$ with respect to $\tilde{\zeta}$ can be computed by treating $\tilde{U}_1(\tilde{\zeta})$ as constant, as:

$$\frac{\partial \hat{O}(\tilde{\zeta})}{\partial \tilde{\zeta}} = \frac{\sum_{u \in U_2} w_u + \sum_{u=t}^{k} w_u}{\tilde{\zeta} + \sum_{u=t}^{k} 1/a_u} \quad (16)$$

Notice now that within each open interval $$\frac{\partial \hat{O}(\tilde{\zeta})}{\partial \tilde{\zeta}}$$

decreases as $\tilde{\zeta}$ increases. Next, the right derivative at the left boundary of the $t^{th}$ interval can be defined and obtained as:

$$\tilde{\zeta} = \frac{\Sigma_{u \in U_2} w_u + \sum_{j=t}^{k} w_j}{w_t a_t} - \sum_{j=t}^{k} 1/a_j \lim_{\delta \to 0^+} \frac{\hat{O}(\tilde{\zeta} + \delta) - \hat{O}(\tilde{\zeta})}{\delta} = \quad (17)$$

$$\frac{\sum_{u \in U_2} w_u + \sum_{u=t}^{k} w_u}{\tilde{\zeta} + \sum_{u=t}^{k} 1/a_u} = w_t a_t,$$

for $t = 1, \ldots, k$.

Similarly, the left derivative at the right boundary of the $(t+1)^{th}$ interval can be defined and obtained as:

$$\tilde{\zeta} = \frac{\Sigma_{u \in U_2} w_u + \sum_{j=t+1}^{k} w_j}{w_t a_t} - \sum_{j=t+1}^{k} 1/a_j = \quad (18)$$

$$\frac{\Sigma_{u \in U_2} w_u + \sum_{j=t}^{k} w_j}{w_t a_t} - \sum_{j=t}^{k} 1/a_j,$$

$$\lim_{\delta \to 0^-} \frac{\hat{O}(\tilde{\zeta} + \delta) - \hat{O}(\tilde{\zeta})}{\delta} = \frac{\sum_{u \in U_2} w_u + \sum_{u=t+1}^{k} w_u}{\tilde{\zeta} + \sum_{u=t+1}^{k} 1/a_u} = w_t a_t.$$

It is seen that the left and right derivatives match. Thus, it has been shown that the derivative of $\hat{O}(\tilde{\zeta})$ exists and is decreasing in $\tilde{\zeta}$ for all $\tilde{\zeta} > 0$ (or equivalently for all $$\zeta > \Sigma_{u \in U_1} \frac{R_u^{min}}{R_u}\Big).$$

This implies that $\hat{O}(\tilde{\zeta})$ is concave in $\tilde{\zeta}$ for all $\tilde{\zeta} > 0$, which suffices to deduce that the result in (13) is indeed true.

Figure 3:
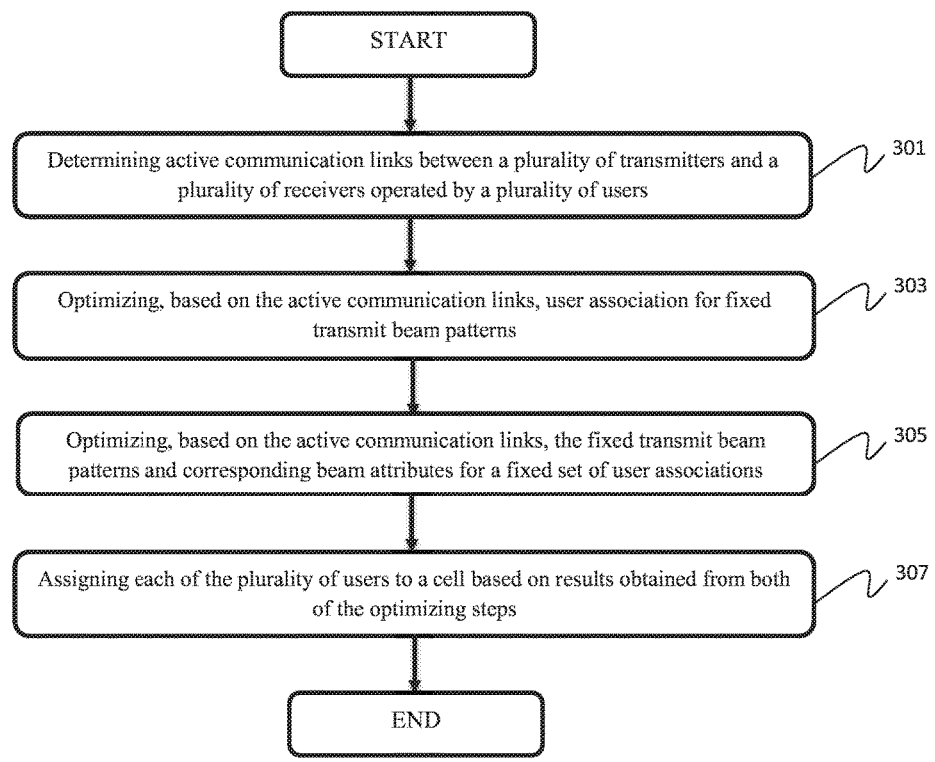
FIG. 3 is a block/flow diagram of a method for establishing communication links in the millimeter wave networks of FIGS. 1 and 2, in accordance with embodiments of the present invention.

FIG. 3 is a block/flow diagram a method for establishing communication links in the millimeter wave networks of FIGS. 1 and 2, in accordance with embodiments of the present invention.

At block 301, determine active communication links between a plurality of transmitters and a plurality of receivers operated by a plurality of users. The plurality of transmitters are transmission points (TPs) and the plurality of receivers are devices of the plurality of users.

At block 303, optimize, based on the active communication links, user association for fixed transmit beam patterns.

At block 305, optimize, based on the active communication links, the fixed transmit beam patterns and corresponding beam attributes for a fixed set of user associations. The beam attributes include at least duty cycles and power allocations. A sum of non-negative fractions for each of the TPs and beam combinations does not exceed unity. A sum of the duty cycles across all activated beams in any of the TPs does not exceed a number of transmit radiofrequency (RF) chains.

At block 307, assign each of the plurality of users to a cell based on results obtained from both of the optimizing steps. The optimizing steps are performed in an alternating manner. The optimizing steps are performed repeatedly or in an iterative manner until an appropriate user is determined. The appropriate user is the user that optimizes the constrained submodular set function maximization problem.

Therefore, active communication links are determined between a plurality of transmitters and a plurality of receivers operated by a plurality of users and a quality of service (QoS) proportional fairness (PF) network utility is then formulated as a constrained submodular set function maximization problem. An optimization framework is then performed by optimizing, based on the active communication links, user association for fixed transmit beam patterns and by optimizing, based on the active communication links, the fixed transmit beam patterns and corresponding beam attributes for a fixed set of user associations. The two optimizing steps are performed in an alternating manner, repeatedly or iteratively, to determine a user from the plurality of users that optimizes the constrained submodular set function maximization problem. Once that user is determined, he/she is assigned to a cell.

The alternating manner can be performed by executing the first optimizing step once and then executing the second optimizing step once (in a successive or sequential or consecutive manner). However, the alternating manner can be performed by executing the first optimizing step twice and then executing the second optimizing step once (executing steps 1 and 2 in an intermittent or interrupted manner). The alternating manner can be performed by executing the first optimizing step twice and then executing the second optimizing step twice (and then repeating between steps 1 and 2). Therefore, the alternating manner can refer to executing the first optimizing step any number of times before executing the second optimizing step any number of times. For example, the first optimizing step can be executed 10 times and the second optimizing step can be executed 4 times, and then the first and second optimizing steps can be alternated on a 1:1 basis until the result is achieved. The alternating execution or optimizing ratio can be 1:1, 1:2, 2:1, 2:2, 3:1, 3:2, 3:3, etc. The alternating ratio can be determined by the constrained submodular set function maximization problem. The alternating execution or optimizing ratio can perform the optimizing steps in an interrupted or intermittent or non-sequential manner. In one example, it is contemplated that the user association is first optimized (step 1) once and then step 2 is executed several or multiple times to optimize the several beam attributes (e.g., duty cycles and power allocations). Based on the multiple iterations of the second optimizing step, the process can refer back to the first optimizing step again for another round of user association optimization.

Figure 4:
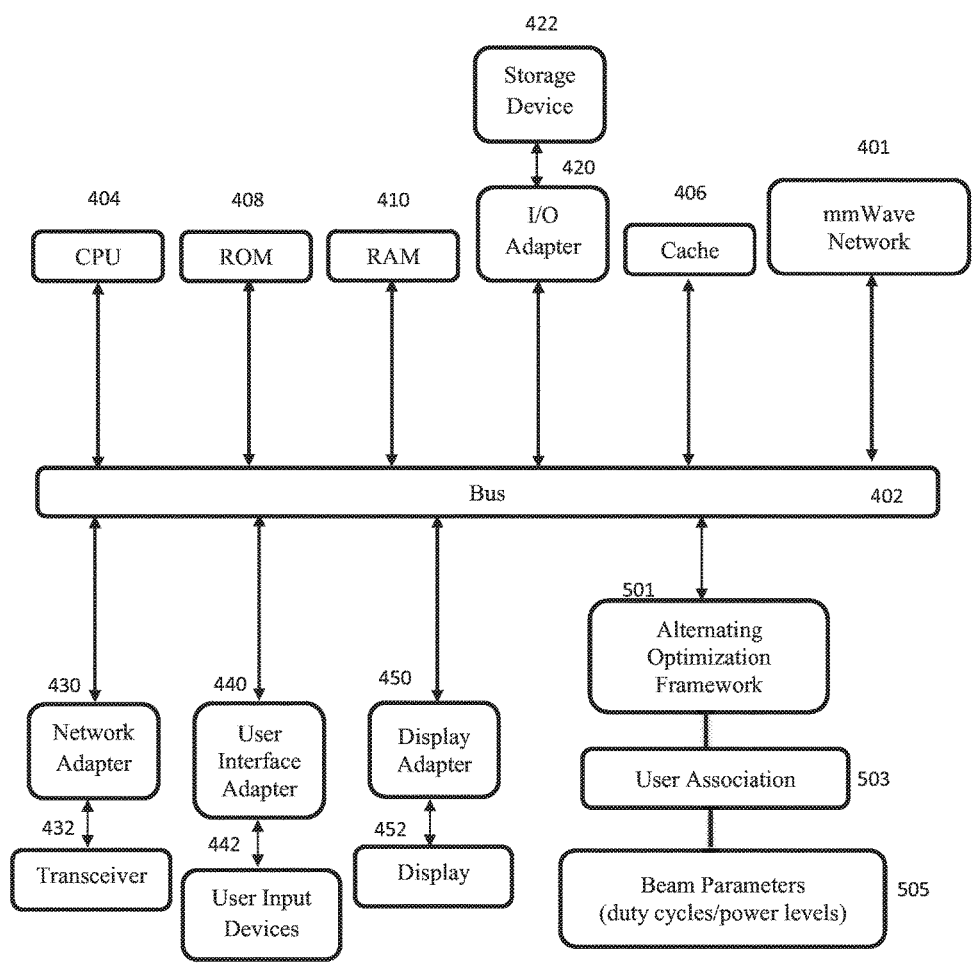
FIG. 4 is an exemplary processing system for establishing communication links in a millimeter wave network, in accordance with embodiments of the present invention.

FIG. 4 is an exemplary processing system for establishing communication links in a millimeter wave network, in accordance with embodiments of the present invention.

The processing system includes at least one processor (CPU) 404 operatively coupled to other components via a system bus 402. A cache 406, a Read Only Memory (ROM) 408, a Random Access Memory (RAM) 410, an input/output (I/O) adapter 420, a network adapter 430, a user interface adapter 440, and a display adapter 450, are operatively coupled to the system bus 402. Additionally, mmWave network 401 and block 501 for employing an alternating optimization framework are operatively coupled to the system bus 402. The alternating optimization framework 501 optimizes at least user association parameters 503 and beam parameters 505.

A storage device 422 is operatively coupled to system bus 402 by the I/O adapter 420. The storage device 422 can be any of a disk storage device (e.g., a magnetic or optical disk storage device), a solid state magnetic device, and so forth.

A transceiver 432 is operatively coupled to system bus 402 by network adapter 430.

User input devices 442 are operatively coupled to system bus 402 by user interface adapter 440. The user input devices 442 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 442 can be the same type of user input device or different types of user input devices. The user input devices 442 are used to input and output information to and from the processing system.

A display device 452 is operatively coupled to system bus 402 by display adapter 450.

Of course, the mmWave network processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the mmWave network processing system are readily contemplated by one of ordinary skill in the art given the teachings of the present invention provided herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed in a wireless communication system for establishing communication links in a millimeter wave (mmWave) network, the method comprising:
    determining active communication links between a plurality of transmitters and a plurality of receivers operated by a plurality of users;
    expressing a quality of service (QoS) proportional fairness (PF) network utility as a constrained submodular set function maximization problem to manage user association between the plurality of users by employing a distributed algorithm to solve the constrained submodular set function maximization problem;
    determining an optimal user association between the plurality of users by executing the distributed algorithm to:
        optimize, based on the active communication links, user association for fixed transmit beam patterns; and
        optimize, based on the active communication links, the fixed transmit beam patterns and corresponding beam attributes for a fixed set of user associations;
    iteratively performing the optimizing steps in an alternating manner to determine a user from the plurality of users that approximately maximizes the constrained submodular set function maximization problem to guarantee convergence to an absorbing state; and
    assigning the determined user to a cell.

2. The method of claim 1, wherein the beam attributes include at least duty cycles and power allocations.

3. The method of claim 2, wherein the plurality of transmitters are transmission points (TPs) and the plurality of receivers are devices of the plurality of users.

4. The method of claim 3, wherein a sum of non-negative fractions for each of the TPs and beam combinations does not exceed unity.

5. The method of claim 3, wherein a sum of the duty cycles across all activated beams in any of the TPs does not exceed a number of transmit radiofrequency (RF) chains.

6. The method of claim 3, wherein sets of duty cycles and power levels at any of the TPs are selected to be compatible with each other.

7. The method of claim 3, wherein minimum rate constraints are imposed for each of the plurality of users.

8. The method of claim 7, wherein each of the plurality of users is permitted to be served by any one of the TPs by using any one beam.

9. The method of claim 1, wherein capacity of the beam patterns is proportional to the beam attributes.

10. A wireless communication system for establishing communication links in a millimeter wave (mmWave) network, the system comprising:
    a memory; and
    a processor in communication with the memory, wherein the processor is configured to:
        determine active communication links between a plurality of transmitters and a plurality of receivers operated by a plurality of users;
        express a quality of service (QoS) proportional fairness (PF) network utility as a constrained submodular set function maximization problem to manage user association between the plurality of users by employing a distributed algorithm to solve the constrained submodular set function maximization problem;
        determining an optimal user association between the plurality of users by executing the distributed algorithm to:
            optimize, based on the active communication links, user association for fixed transmit beam patterns; and
            optimize, based on the active communication links, the fixed transmit beam patterns and corresponding beam attributes for a fixed set of user associations;
        iteratively perform the optimizing steps in an alternating manner to determine a user from the plurality of users that approximately maximizes the constrained submodular set function maximization problem to guarantee convergence to an absorbing state; and
        assign the determined user to a cell.

11. The system of claim 10, wherein the beam attributes include at least duty cycles and power allocations.

12. The system of claim 11, wherein the plurality of transmitters are transmission points (TPs) and the plurality of receivers are devices of the plurality of users.

13. The system of claim 12, wherein a sum of non-negative fractions for each of the TPs and beam combinations does not exceed unity.

14. The system of claim 12, wherein a sum of the duty cycles across all activated beams in any of the TPs does not exceed a number of transmit radiofrequency (RF) chains.

15. The system of claim 12, wherein sets of duty cycles and power levels at any of the TPs are selected to be compatible with each other.

16. The system of claim 12, wherein minimum rate constraints are imposed for each of the plurality of users.

17. The system of claim 16, wherein each of the plurality of users is permitted to be served by any one of the TPs by using any one beam.

18. The system of claim 10, wherein capacity of the beam patterns is proportional to the beam attributes.

19. A non-transitory computer-readable storage medium comprising a computer-readable program for establishing communication links in a millimeter wave (mmWave) network, wherein the computer-readable program when executed on a computer causes the computer to perform the steps of:
    determining active communication links between a plurality of transmitters and a plurality of receivers operated by a plurality of users;
    expressing a quality of service (QoS) proportional fairness (PF) network utility as a constrained submodular set function maximization problem to manage user association between the plurality of users by employing a distributed algorithm to solve the constrained submodular set function maximization problem;

determining an optimal user association between the plurality of users by executing the distributed algorithm to:
  optimize, based on the active communication links, user association for fixed transmit beam patterns; and
  optimize, based on the active communication links, the fixed transmit beam patterns and corresponding beam attributes for a fixed set of user associations;
iteratively performing the optimizing steps in an alternating manner to determine a user from the plurality of users that approximately maximizes the constrained submodular set function maximization problem to guarantee convergence to an absorbing state; and
assigning the determined user to a cell.

20. The non-transitory computer-readable storage medium of claim 19, wherein the beam attributes include at least duty cycles and power allocations.

* * * * *